US006998739B2

(12) United States Patent  
McCain et al.

(10) Patent No.: US 6,998,739 B2
(45) Date of Patent: Feb. 14, 2006

(54) ALTERNATOR COVER SHIELD

(76) Inventors: Van D. McCain, 456 Stable Rd., Ruston, LA (US) 71270; Jeffery R. Simmons, 191 Harrison Rd., Ruston, LA (US) 71270

( * ) Notice: Subject to any disclaimer, the term of this patent is extended or adjusted under 35 U.S.C. 154(b) by 0 days.

(21) Appl. No.: 10/764,120

(22) Filed: Jan. 26, 2004

(65) Prior Publication Data

US 2005/0162026 A1 Jul. 28, 2005

(51) Int. Cl.
*H02K 15/00* (2006.01)
(52) U.S. Cl. ........................ 310/42; 290/1 A; 290/1 B; 123/198 E
(58) Field of Classification Search .................. 310/42, 310/112, 113, 89; 290/1 A, 1 B, 46–48; 123/2, 3, 179.1, 179.24, 179.28, 185.3, 198 E; 29/888.011
See application file for complete search history.

(56) References Cited

U.S. PATENT DOCUMENTS 2,939,448 A * 6/1960 Hansen .................. 123/179.24
3,744,468 A * 7/1973 Braun ..................... 123/185.2
3,952,712 A * 4/1976 Hermanson .............. 123/41.65
4,779,905 A * 10/1988 Ito et al. ..................... 290/1 B
5,010,858 A * 4/1991 Schierling et al. ...... 123/179.24
5,011,442 A * 4/1991 Polcz et al. ................. 440/113

* cited by examiner

*Primary Examiner*—Dang Le

(57) ABSTRACT

An alternator cover shield which is designed to close the starter pulley opening or cavity in an alternator cover when the recoil assembly has been removed. The alternator cover shield is characterized by a flat, typically transparent plate fitted with spaced-apart peripheral plate openings for receiving mount bolts that typically extend through aligned openings in a correspondingly-shaped gasket interposed between the plate and the alternator cover face to facilitate securing the plate on the alternator cover and preventing dirt, debris, water and the like from entering the starter pulley cavity. The weep hole in the alternator cover is sealed with a plug and a pulley nipple is inserted in the pulley opening located in the alternator cover at the base of the starter pulley cavity and bolted in place to seal the pulley opening. A method of sealing the cavity in an alternator cover against the intrusion of foreign matter, which includes the steps of removing the recoil assembly and starter pulley from the cavity and the pulley opening, respectively, inserting a pulley nipple in the pulley opening, closing the cavity with a sealing plate and inserting a plug in the weep hole of the alternator cover.

4 Claims, 3 Drawing Sheets

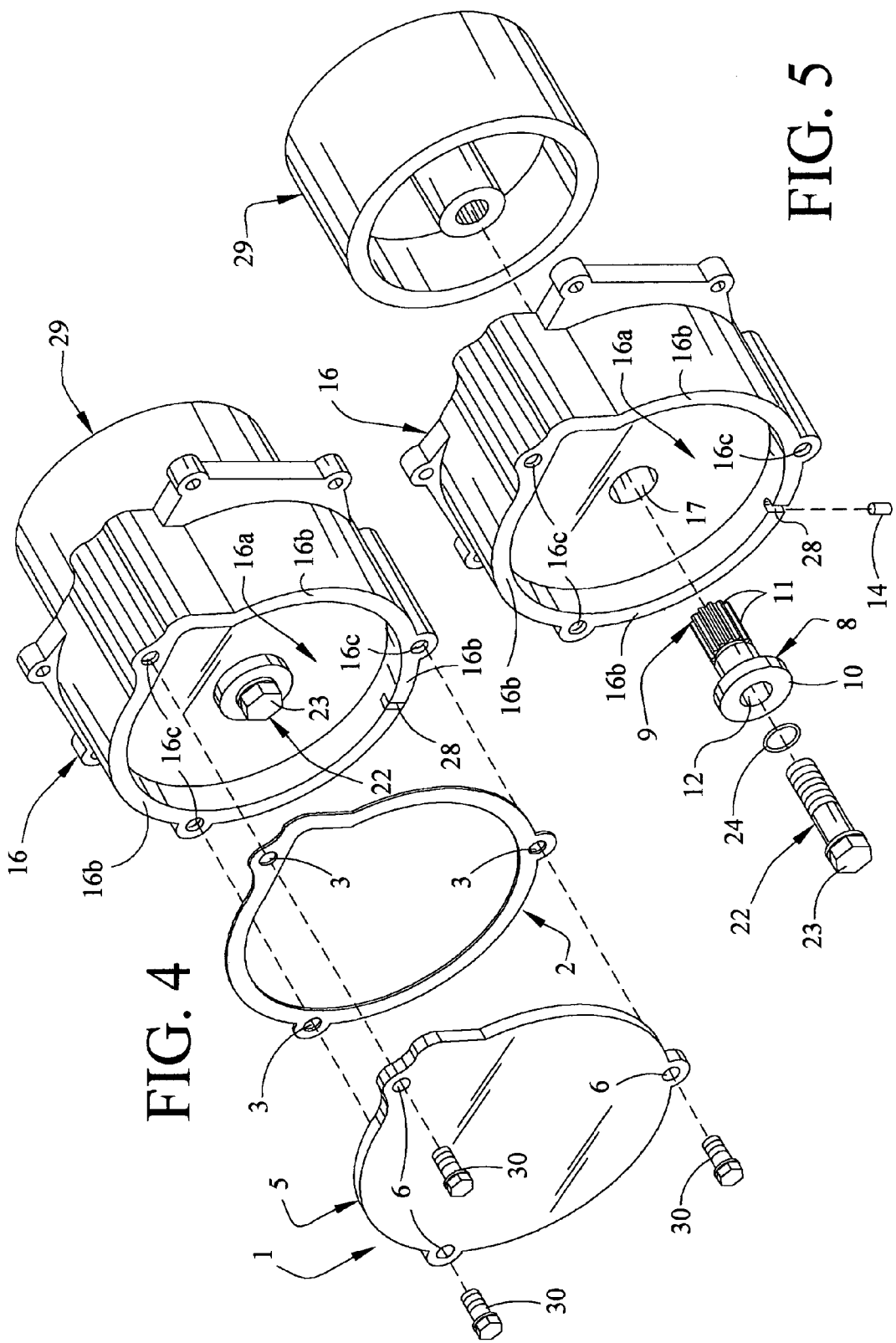

ALTERNATOR COVER SHIELD

SUMMARY OF THE INVENTION

This invention relates to all-terrain vehicles (ATV) and more particularly, to an alternator cover shield or plate and method for replacing the conventional recoil mechanism or assembly on an alternator cover when the recoil assembly is rendered inoperable by the intrusion of dirt, water, grime and the like into the alternator cover cavity. Such intrusion makes it difficult or impossible to operate the rewind mechanism, rotate the starter pulley and manually start the ATV engine. Since ATV engines also have an automatic starter powered by a battery, the recoil assembly mechanism is not essential to the operation of the ATV and may be quickly and easily replaced by the alternator cover shield of this invention by simply removing the recoil assembly bolts, removing the recoil assembly, loosening the pulley bolt, removing the starter pulley, replacing the starter pulley with a pulley nipple, fitting the shield and underlying gasket to the alternator cover mount face and bolting the alternator cover shield in place over the gasket. The starter pulley is replaced by using the pulley bolt to secure a pulley nipple that may be splined or smooth and fits in the pulley opening at the base of the cover cavity in the alternator cover, where it is bolted in place with an O-ring or seal washer. The splined end of a splined pulley nipple engages the drive gear in the engine assembly and rotates with the pulley nipple bolt, while a smooth nipple may be sized to prevent contact with the rotating flywheel. A rubber plug typically seals the conventional weep hole provided in the alternator cover to further prevent intrusion of undesirable dirt, grime or water into the alternator cavity cover through that opening. The alternator cover shield is typically flat and may be constructed of a clear plastic material or the like, according to the knowledge of those skilled in the art, in order to view the alternator cover cavity and determine whether any water, dirt, or grime intrusion has occurred. Alternatively, the alternator cover shield can be constructed of metal, fiberglass or other materials, further according to the knowledge of those skilled in the art.

BRIEF DESCRIPTION OF THE DRAWINGS

The invention will be better understood by reference to the accompanying drawings, wherein:

FIG. 4 is an exploded view of the alternator cover and the alternator cover shield illustrated in FIG. 1; and FIG. 5 is an exploded view of the pulley nipple component illustrated in FIG. 4.

DESCRIPTION OF THE PREFERRED EMBODIMENTS

Figure 1:
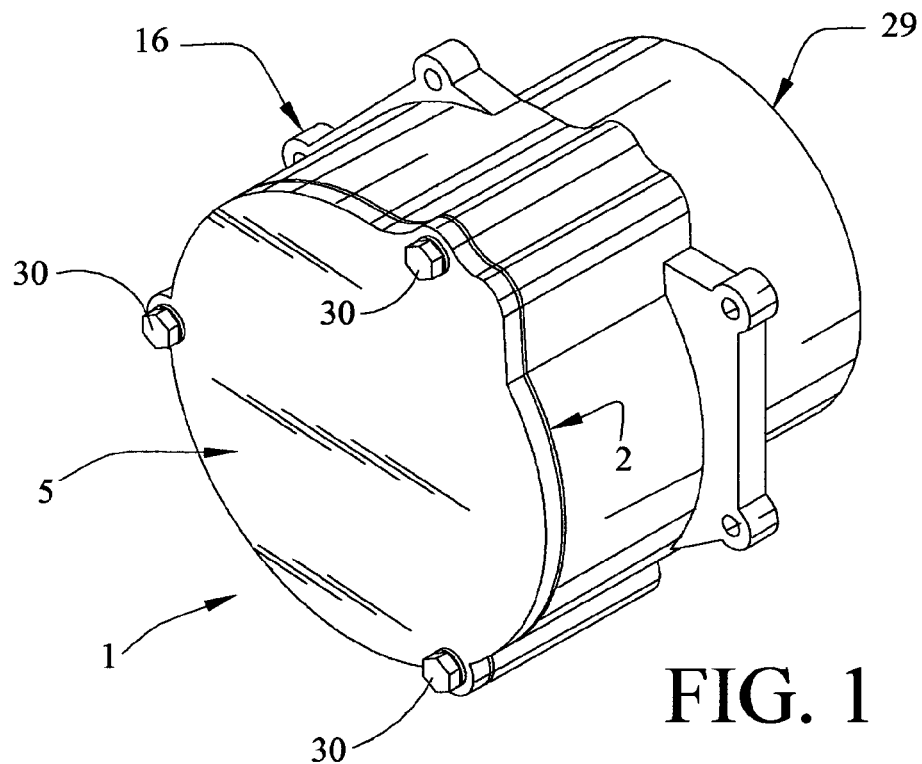
FIG. 1 is a perspective view of a conventional all-terrain vehicle (ATV) alternator cover with a preferred embodiment of the alternator cover shield mounted in functional configuration thereon.

Referring initially to FIGS. 1, 4 and 5 of the drawings the alternator cover shield of this invention is generally illustrated by reference numeral 1. The alternator cover shield 1 includes a typically flat cover shield 5, which may be constructed of a transparent plastic or a metal, fiberglass or other material, in non-exclusive particular, along with a gasket 2 which is preferably configured like the cover shield 5 and interposed between the cover shield 5 and the mount face 16b of an alternator cover 16 (FIG. 4). Gasket bolt openings 3 are spaced-apart in the gasket 2 and are aligned with corresponding cover shield bolt openings 6 provided in the cover shield 5, for receiving mount bolts 30 which are threaded into the corresponding, internally-threaded cover bolt holes 16c, provided in the mount face 16b of the alternator cover 16, as further illustrated in FIG. 4. Accordingly, it will be apparent from a consideration of FIGS. 1 and 4 that the cover shield 5 can be tightly sealed against the gasket 2 on the mount face 16b of the alternator cover 16 by tightening the mount bolts 30. This fitting of the cover shield 5 to the alternator cover 16 seals the cover cavity 16a (FIG. 4) of the alternator cover 16 against the intrusion of dirt, grime, water and other undesirable components, under circumstances where the weep hole 28, provided in the alternator cover 16, is also sealed, typically by a flexible resilient rubber plug 14 (FIG. 5).

Figure 2:
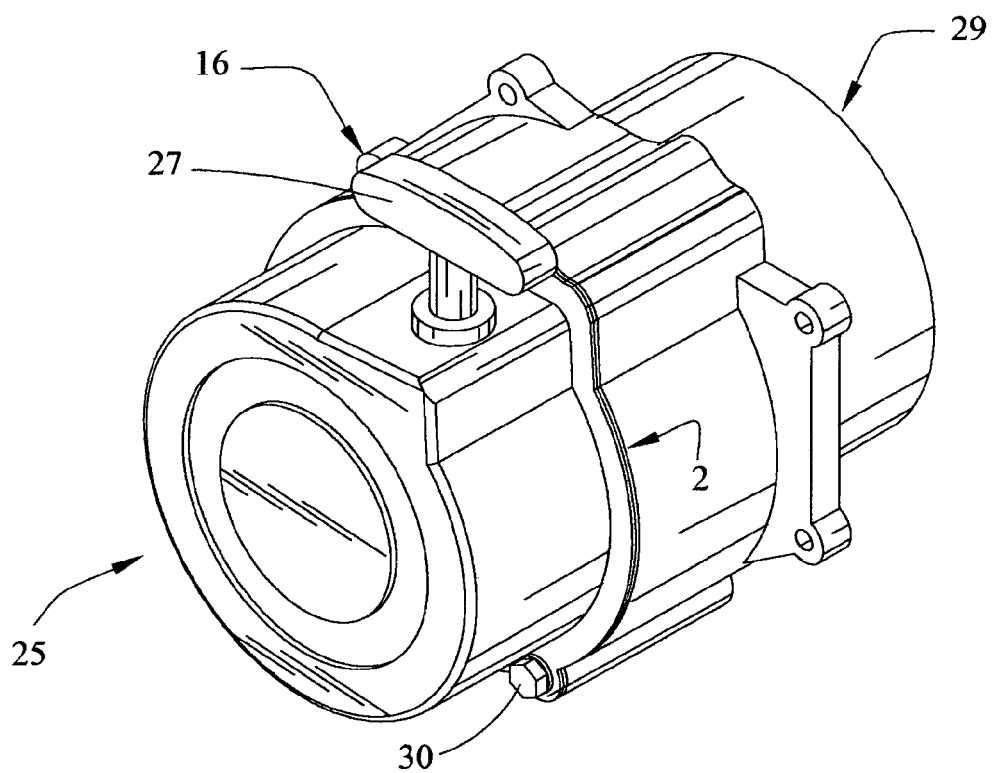
FIG. 2 is a perspective view of a typical ATV alternator cover with a conventional recoil assembly bolted thereon.
Figure 3:
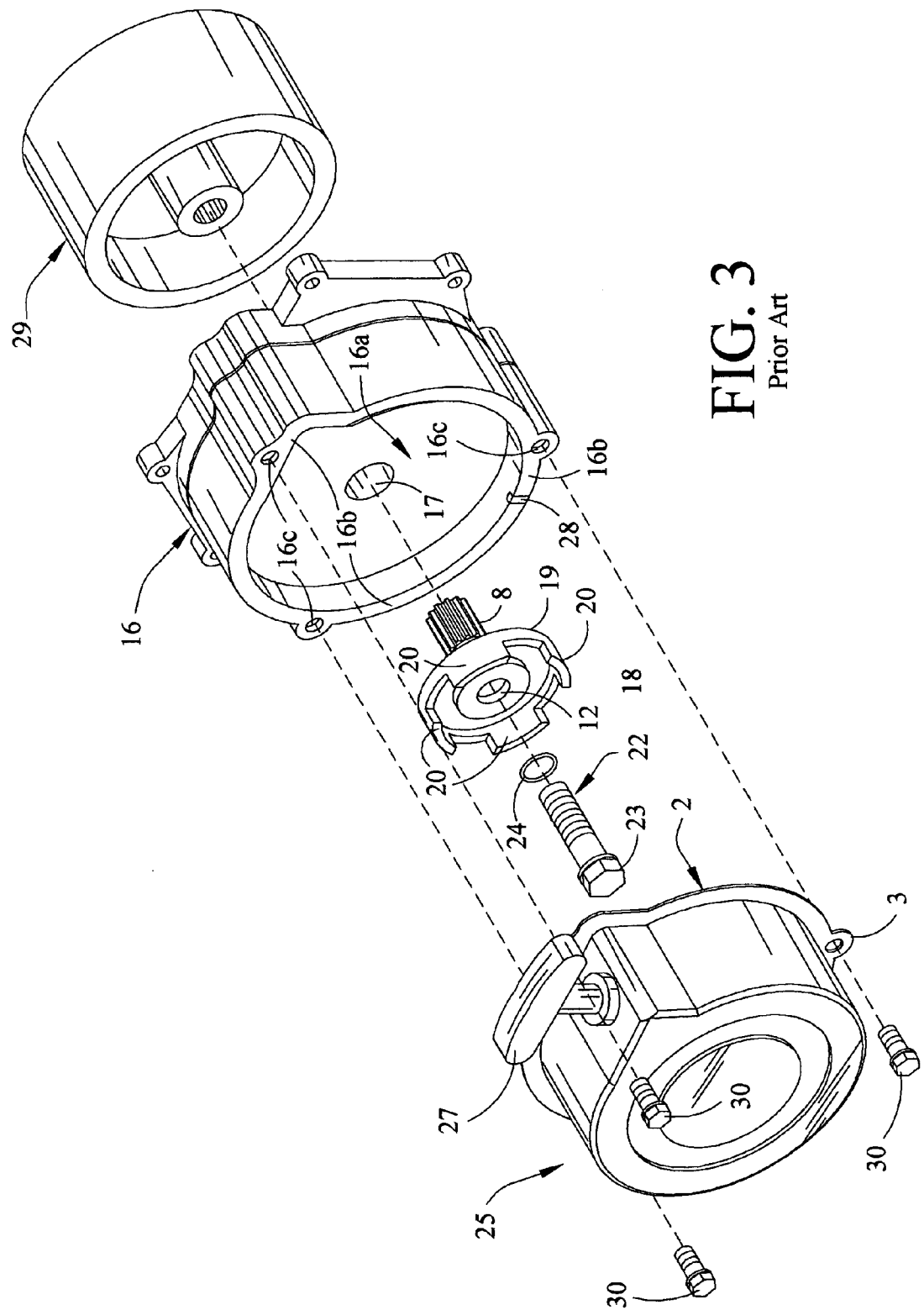
FIG. 3 is an exploded view of the conventional recoil assembly components and alternator cover illustrated in FIG. 2.

Referring now to FIGS. 1–5 of the drawings the cover shield 5 is designed to replace a recoil assembly 25, fitted with a starter pulley 18 and a rewind cord or rope (not illustrated) having a recoil rope handle 27, as illustrated in FIGS. 2 and 3. A nipple 8 may be shaped from a starter pulley 18, or otherwise manufactured with or without the splines 11 and seated in a pulley opening 17 provided in the alternator cover 16 at the base of the cover cavity 16a, by means of a pulley bolt 22, having a bolt head 23, typically seated on a bolt O-ring 24 (FIGS. 4 and 5). The conventional starter pulley 18 component of the recoil assembly 25 is illustrated in FIG. 3 and includes a starter pulley plate 19, having upward-standing, spaced-apart flanges 20 for engaging a corresponding spring-loaded mechanism (not illustrated) also located in the recoil assembly 25, which mechanism is activated by pulling the recoil rope handle 27 outwardly of the recoil assembly 25 to start the ATV engine (not illustrated) in conventional fashion (FIG. 2). The pulley nipple 8 typically includes a nipple base 9, extending from a base flange 10 and a nipple bore 12 for accommodating the pulley bolt 22.

Referring now to FIGS. 1, 4 and 5 of the drawings, under circumstances where the alternator cover shield 1 is used to replace the recoil assembly 25 on the alternator cover 16, the pulley nipple 8 may be constructed by removing the starter pulley plate 19 and the plate flanges 20 of the starter pulley 18, or otherwise manufactured by techniques known to those skilled in the art. The pulley nipple 8 is then seated in the pulley opening 17, as in the conventional arrangement illustrated in FIG. 3, and is bolted in place using the same pulley bolt 22 and a bolt O-ring 24. Accordingly in one embodiment the splines 11, fitted on the extending end of the pulley nipple 8, engage a drive gear (not illustrated) in the engine (not illustrated) in the same manner as in the conventional mechanical configuration wherein the conventional starter pulley 18 is utilized. The bolt O-ring 24 typically seats in the bolt head 23 against the base flange 10 of the pulley nipple 8, to seal the pulley opening 17 from intrusion of dirt, grime, water or other undesirable components which may migrate into the cover cavity 16a of the alternator cover 16.

Accordingly, it will be appreciated from a consideration of FIGS. 1, 4 and 5 that the cover shield 5 and the plug 14 prevent intrusion of water, dirt, grime or other undesirable components or elements into the cover cavity 16a of the alternator cover 16 when the pulley nipple 8 is mounted in the pulley mount opening 17 (FIGS. 4 and 5) and the cover shield 5 is sealed in the position illustrated in FIG. 1. Under these circumstances, the drive gear (not illustrated) is operated by electrical means in conventional fashion through a suitable mechanical and electrical arrangement in the all-terrain vehicle engine (not illustrated). The alternator cover shield of this invention thus serves to replace the recoil assembly 25 in an ATV engine and prevent further water, dirt, grime or other undesirable element intrusion into the cover cavity 16*a* of the alternator cover 16 during operation of the ATV.

While the preferred embodiments of the invention have been described above, it will be recognized and understood that various modifications may be made in the invention and the appended claims are intended to cover all such modifications which may fall within the spirit and scope of the invention.

What is claimed is:

1. A method of sealing the starter pulley cavity of an engine alternator cover comprising the steps of:

(a) removing the recoil assembly from the alternator cover;
   (b) removing the starter pulley from the pulley mount opening in the starter pulley cavity;
   (c) inserting a pulley nipple in the pulley mount opening; and
   (d) mounting a plate on the alternator cover for closing the starter pulley cavity.

2. The method according to claim 1 comprising the step of inserting a plug in the weep hole of the alternator cover.

3. The method of claim 2 comprising the step of interposing a gasket between said plate and the alternator cover.

4. The method according to claim 2 comprising the steps of:

(a) inserting a plug in the weep hole of the alternator cover; and
   (b) interposing a gasket between said plate and the alternator cover.

* * * * *